(12) United States Patent
Boonekamp et al.

(10) Patent No.: US 6,639,342 B2
(45) Date of Patent: Oct. 28, 2003

(54) ELECTRIC LAMP (75) Inventors: Erik Paul Boonekamp, Eindhoven (NL); Johannes Adrianus Frederikus Peek, Leves (FR); Wolfgang Doetter, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 179 days.

(21) Appl. No.: 09/880,208

(22) Filed: Jun. 13, 2001

(65) Prior Publication Data
US 2002/0030426 A1 Mar. 14, 2002

(30) Foreign Application Priority Data

Jun. 16, 2000 (EP) .............................. 00202085
Nov. 2, 2000 (EP) .............................. 00204105

(51) Int. Cl.[7] ............................ H01J 61/40; H01K 1/26
(52) U.S. Cl. .................... 313/112; 313/113; 313/114
(58) Field of Search ................... 313/635, 489, 313/479, 112, 113, 114, 573, 580

(56) References Cited

U.S. PATENT DOCUMENTS 3,630,809 A * 12/1971 Edwards .................. 161/2
4,082,635 A * 4/1978 Fritz et al. ............. 204/159.23
5,378,274 A * 1/1995 Yokoyama et al. ......... 106/410
5,608,227 A * 3/1997 Dierks et al. ............ 250/492.1

FOREIGN PATENT DOCUMENTS

| DE | G86006423 | 7/1986 | ............ H01K/1/32 |
| EP | 0037529 A2 | 10/1981 | ............ G03F/7/00 |
| WO | WO0002231 | 1/2000 | ............ H01K/1/26 |

* cited by examiner

Primary Examiner—Ashok Patel
Assistant Examiner—Jason Phinney (57) ABSTRACT

The electric lamp employs a lamp vessel (1), which is transparent to visible light and which accommodates a light source (2). The lamp vessel (1) is covered with a combination of a light-absorbing medium (6) and an optical interference film (5) employing layers of alternately a first layer of a material with a comparatively high refractive index and a second layer of silicon dioxide. A spectral transmission T of light transmitted by the light-absorbing medium (6) changes from $T \leq 0.15$ to $T \geq 0.75$ in a wavelength range having a width $\lambda \leq 50$ nm. The variation in reflection R amounts to less than 10% in the wavelength range $400 \leq R \leq 690$ nm, the reflection R and lies in the range $50 \leq R \leq 90\%$. In operation, the electric lamp emits colored light in the transmission mode and has a substantially color-neutral appearance in the off state.

4 Claims, 8 Drawing Sheets

ELECTRIC LAMP

BACKGROUND OF THE INVENTION

1. Field of the Invention

The present invention relates to an electric lamp employing a light-transmitting lamp vessel in which a light source is arranged, the electric lamp employing a light-absorbing medium exhibiting a spectral transition in the visible range, where at least a part of the lamp vessel being provided with an interference film.

Such lamps are used in automotive applications, for example as a (halogen) headlamp which, in operation, emits yellow light, as an amber-colored light source in indicators (also referred to as vehicle signal lamps) or as a red-colored light source in brake lights. Such electric lamps are also used for general illumination purposes. The electric lamps are further used in traffic and direction signs, contour illumination, traffic lights, projection illumination and fiber optics illumination. Alternative embodiments of such lamps employ lamps wherein the color temperature is increased by a suitable combination of a light-absorbing coating and an interference film.

2. Description of the Related Art

In a known electric lamp, an interference film reflecting blue light is provided on the lamp vessel of a (halogen) headlamp, which lamp, in operation, emits yellow light. Besides, a light-absorbing medium for absorbing the blue light reflected by the interference film is provided on an outer surface of the lamp vessel, between the lamp vessel and the interference film.

A drawback of the known lamps is that the appearance of the lamp is insufficiently color-neutral.

SUMMARY OF THE INVENTION

It is an object of the invention to provide an electric lamp to obviate the aforementioned drawback with the prior art.

This object is achieved, in accordance with the invention, in that the light-absorbing medium exhibits a comparatively steep spectral transition in the visible range.

To achieve this, the electric lamp in accordance with the present invention comprises a light-absorbing medium wherein a spectral transmission T of light transmitted by the light-absorbing medium changes from $T \leq 0.15$ to $T \geq 0.75$ in a wavelength range having a width $\lambda \leq 75$ nm.

The application of a light-absorbing medium having such a comparatively steep spectral characteristic in an electric lamp whose lamp vessel is provided with an interference film results in an electric lamp having an improved color-neutral appearance. In the known electric lamp, a light-absorbing medium, such as $Fe_2O_3$, is used whose spectral characteristic gradually changes over a comparatively large wavelength range. As a result, the spectral transmission of the combination of interference film and light-absorbing medium is subject to change over a comparatively large range of the visible region, which is accompanied by color effects, which are generally undesirable. The known electric lamp emits yellow light in operation, but in the off state, it is blue in appearance.

By applying, in accordance with the invention, a light-absorbing medium having a comparatively steep spectral characteristic, the spectral changes in the visible region are limited to a comparatively small wavelength range, which is favorable for obtaining a color-neutral appearance of the electric lamp. In operation, the electric lamp in accordance with the invention emits light of the desired color. In the offstate, the electric lamp in accordance with the invention is color-neutral in appearance.

Preferably, in the above-mentioned wavelength range, the spectral emission of the light transmitted by the light-absorbing medium changes from $T \leq 0.10$ to $T \geq 0.80$. Preferably, there is a change in the spectral transmission T of light transmitted by the light-absorbing medium in a wavelength range having a width $\lambda \leq 50$ nm. The color-neutral appearance of the electric lamp is better as the spectral transition in the light-absorbing medium is steeper. It is particularly favorable for the change in spectral emission in the light-absorbing medium to occur in a wavelength range from 30 to 40 nm.

In a preferred embodiment, the electric lamp is provided with an interference film having an at least substantially flat reflection spectrum over at least substantially the entire visible region. To achieve this, the electric lamp in accordance with the invention is characterized in that the variation in the reflection R of the interference film in the wavelength range from $400 \leq \lambda \leq 690$ nm is less than 10%.

In this preferred embodiment, within the given variation range, the reflection spectrum exhibits no negligible peaks or dips in the relevant range of the visible spectrum. As the reflection by the interference film is uniform throughout the visible region, the reflection is at least substantially independent of the wavelength in the relevant part of the visible region. The interference film in accordance with the invention will reflect all colors in the visible spectrum in the same manner and provides the electric lamp with a color-neutral appearance.

In the known electric lamp, a combination of a light-absorbing medium and an interference film is applied, said interference film comprising a so-called step filter. The term "step filter" is to be taken to mean in the description of the current invention that the reflection spectrum exhibits a comparatively sharp spectral transition (from $R \approx 100\%$ to $R \leq 10\%$) in a comparatively narrow wavelength range ($\leq 20$ nm). The positioning of the spectral transition of this step filter is very sensitive to process variations. Small variations readily lead to a shift of the spectral transition, as a result of which the known electric lamp no longer meets legal requirements. In the known electric lamp, it is further necessary to apply an interference film having a comparatively high reflection in the relevant spectral range, thus rendering necessary a stack of comparatively many optical layers. These high reflection values are necessary to sufficiently enhance the comparatively small effect of the comparatively thin light-absorbing medium. In addition, the optical layers in the interference film of the known electric lamp must be at least substantially absorption-free in order to realize the high reflection values of the step filter. In the known electric lamp, the spectral transition of the step filter lies in a wavelength range from approximately 530 to approximately 540 nm.

It is to be noted further that the visible region globally comprises the wavelength range from $380 \leq \lambda \leq 780$ nm. Taking into account the sensitivity of the human eye and the fact that the eye sensitivity curve decreases rapidly at the edges of the visible region, it is sufficient, in practice, if the reflection spectrum in the electric lamp in accordance with the invention is at least substantially flat in the wavelength range from $400 \leq \lambda \leq 690$ nm. In a preferred embodiment of the electric lamp, the variation of the reflection R of the interference film in the wavelength range from $380 \leq \lambda \leq 780$ nm is less than 10%. Experiments have shown that a 5–10% variation in the reflection of the interference film can be readily achieved throughout the visible region.

A preferred embodiment of the electric lamp in accordance with the invention is characterized in that the reflection R of the interference film lies in the range from $0.50 \leq R \leq 0.90$. In this preferred embodiment, the interference film has a metallic or silvery appearance. As a result thereof, the electric lamp in accordance with the invention can very suitably be used as an indicator lamp for automotive applications. Statutory regulations define a range, in the 1931 C.I.E. color triangle known to those skilled in the art, for the color point of the light emitted by such indicator lamps. A suitable combination of a light-absorbing medium and an interference film applied to an outside surface of the lamp vessel enables the appearance of the electric lamp to be changed. This particularly enables a distinction to be made between the appearance of the electric lamp in the off state and the color of the light emitted by the electric lamp during operation. The aim is, in particular, to provide an electric lamp which, in operation, emits a certain color, for example a so-called amber-colored or red-colored electric lamp, while, in the off state, the electric lamp has an at least substantially color-neutral appearance.

In vehicles it is desirable, for esthetical reasons, to provide indicator lamps and brake lights with a color-neutral appearance. Only when the electric lamp is activated, it shows the desired color, whereby the color point of the light emitted by the electric lamp meets statutory regulations. Moreover, in vehicles there is a tendency to accommodate amber-colored indicator lamps in the same reflector as the headlamp instead of in a separate reflector. In addition, the aim is to use luminaires in vehicles, which are provided with so-called "clear covers", i.e., an observer situated outside the vehicle can directly see the indicator lamps or brake lamps in the luminaire. For reasons of safety, it is important that, apart from a color-neutral appearance, such indicator lamps are at least substantially free of coloring in reflection at light which is (accidentally) incident on the electric lamp. If, for example, sunlight or light originating from on-coming traffic is incident on a headlamp of a vehicle comprising an indicator lamp, the appearance of said headlamp, in reflection, should be at least substantially colorless or, in reflection, said lamp should emit at least substantially no color. Otherwise, this might confuse other road users and give rise to unsafe and/or undesirable situations.

In reflection, the spectral characteristic of the electric lamp in accordance with the invention differs from the spectral characteristic in transmission. In transmission, the light emitted by the electric lamp meets statutory regulations with respect to the color point, while, in reflection, the electric lamp is color-neutral, the appearance of the electric lamp being, for example, silvery. The current invention applies, in particular, to indicator lamps and brake lights of vehicles.

A synergetic effect is achieved using an electric lamp comprising a combination of a light-absorbing medium with a steep transition and an interference film giving the electric lamp a color-neutral appearance. In addition, the presence of the interference film may increase the stability of the light-absorbing medium in that the interference film serves as an oxygen barrier for the light-absorbing medium. Moreover, the interference film can counteract loss of color of the light-absorbing medium under the influence of external UV light, for example by a suitable material choice, a suitably chosen band gap (for example $TiO_2$) or as a result of the fact that the interference film also reflects UV light. Experiments have shown that the adhesion of the combination of light-absorbing medium and interference film on the lamp vessel of the electric lamp is satisfactory and not, or hardly, subject to change during the service life. During the service life of the electric lamp in accordance with the invention, no visible delamination of the applied coatings is detected.

A further advantage of the application of an electric lamp comprising a combination of a light-absorbing medium with a steep transition and an interference film giving the electric lamp a color-neutral appearance, is that the spectral characteristic of the light-absorbing layer is less sensitive to variations in the location of the spectral transition in the light-absorbing layer. This implies that the spectral characteristic of the light-absorbing layer is less sensitive to variations in the thickness and/or the concentration of the light-absorbing medium.

An embodiment of an electric lamp in accordance with the invention is characterized in that a wall of the lamp vessel comprises the light-absorbing medium. Light-absorbing media can be readily incorporated in the wall of the lamp vessel, which is made, for example, from glass, such as quartz glass or hard glass, or from a translucent ceramic material. In this embodiment, the interference film is preferably directly applied to a side of the wall of the lamp vessel facing away from the light source. As the light-absorbing medium is provided in the wall of the lamp vessel and the interference film, light, which is reflected by the interference film, passes the light-absorbing medium twice, which leads to a further improvement of the effectiveness of the absorption process. In addition, light which is reflected to and fro between the interference film on both sides of the lamp vessel passes the light-absorbing medium twice at each reflection.

An alternative embodiment of the electric lamp in accordance with the invention is characterized in that the light-absorbing medium comprises a light-absorbing layer which is situated between the lamp vessel and the interference film. As the light-absorbing medium is arranged between the outside surface of the lamp vessel and the interference film, light, which is reflected by the interference film, passes the light-absorbing medium twice, which leads to a further improvement of the effectiveness of the absorption process. In addition, light which is reflected to and fro between the interference film on both sides of the lamp vessel passes the light-absorbing layer twice at each reflection.

A thickness $t_{abs}$ of the light-absorbing layer preferably lies in a range from $5 \text{ nm} \leq t_{abs} \leq 5000 \text{ nm}$. If the thickness of the light-absorbing layer is smaller than 5 nm, absorption hardly takes place and the intended shift of the color temperature is insufficiently achieved. If the thickness of the layer exceeds 5 $\mu$m, too much light is absorbed, which adversely affects the lumen output of the electric lamp. A light-absorbing layer having a thickness of $1.5 \leq t_{abs} \leq 2$ $\mu$m is very suitable. The desired layer thickness is also prompted by the concentration of the pigment in the light-absorbing coating.

A preferred embodiment of the electric lamp is characterized in that the light-absorbing coating comprises a network, which can be obtained by converting an organically modified silane by a sol-gel process, said organically modified silane being selected from the group formed by compounds of the structural formula $R^I Si(OR^{II})_3$, $R^I$ comprising an alkyl group or an aryl group, and $R^{II}$ comprising an alkyl group.

By making the light-absorbing layer from a network comprising an organically modified silane as the starting material, an optically transparent, non-scattering, light-absorbing coating is obtained which is capable of resisting temperatures up to 400° C. By using an organically modified silane in the manufacture of the network, a part of the $R^I$ groups, the alkyl or aryl groups, remains in the network as an end group. As a result, the network does not comprise four network bonds per Si atom, but less than four network bonds per Si atom. In this manner, for example, a network is obtained comprising, on average, approximately three network bonds per Si atom. In spite of the fact that the network is partly composed of said alkyl or aryl groups, a network is obtained whose density is at least substantially equal to that of the customary silica network. Unlike the customary silica network, a network which is partly composed of said alkyl or aryl groups has a greater elasticity and flexibility. As a result, it becomes possible to manufacture comparatively thick light-absorbing coatings.

Preferably, the $R^I$ group comprises $CH_3$ or $C_6H_5$. These substances have a comparatively good thermal stability. A network comprising methyl or phenyl groups enables thicker coating layers to be obtained. Experiments have further shown that coatings, wherein methyl or phenyl groups are incorporated in a network, are stable to a temperature of at least 350° C. Said groups form end groups in the network and remain part of the network at said higher temperatures. At such a comparatively high temperature load on the light-absorbing coating, no appreciable degradation of the network occurs during the service life of the electric lamp.

Preferably, the $R^{II}$ group comprises $CH_3$ or $C_2H_5$. Methyl and ethyl groups are particularly suitable because methanol and ethanol are formed in the hydrolysis, which substances are compatible with the pigment dispersion and evaporate comparatively easily. In general, the methoxy groups ($-OCH_3$) react more rapidly than the ethoxy groups ($-OC_2H_5$) which in turn react more rapidly than (iso) propoxy groups ($-OC_3H_7$). For a smooth hydrolysis process, use is advantageously made of $R^{II}$ groups which are not too long.

Particularly suitable starting materials for the manufacture of the network in accordance with the invention are methyltrimethoxysilane (MTMS), wherein $R^I=R^{II}=CH_3$, methyltriethoxysilane (MTES), wherein $R^I=CH_3$ and $R^{II}=C_2H_5$, phenyltrimethoxysilane (PTMS), wherein $R^I=C_6H_5$ and $R^{II}=CH_3$, and phenyltriethoxysilane (PTES), wherein $R^I=C_6H_5$ and $R^{II}=C_2H_5$. Such starting materials are known per se and commercially available.

A preferred embodiment of the electric lamp is characterized in that the light-absorbing medium has an amber-colored or red-colored transmission. Electric lamps which, in operation, emit amber-colored light can particularly suitably be used as an indicator lamp in vehicles. Electric lamps which, in operation, emit red light are particularly suitable as brake lights in vehicles.

The choice of selectively light-absorbing layers is limited by the requirement which, in accordance with the invention, is to be met by the steepness of the change of the spectral transmission of the light-absorbing medium. The choice of selectively light-absorbing layers is further limited by the thermal requirements to be met by such a light-absorbing layer. Said thermal requirements include the durability of the light-absorbing medium during the service life and the resistance to changing temperatures of the lamp vessel.

Preferably, the light-absorbing medium has an amber-colored transmission. A particularly suitable light-absorbing medium is CHROMOPHTAL yellow, chemical formula $C_{22}H_6C_{18}N_4O_2$ and C.I. (constitution number) 56280. This organic dye is also referred to as "C.I.-110 yellow pigment", "C.I. pigment yellow 137" or Bis[4,5,6,7-tetrachloro-3-oxoisoindoline-1-ylidene)-1,4-phenylenediamine. An alternative light-absorbing medium having an amber-colored transmission is yellow anthraquinone, chemical formula $C_{37}H_{21}N_5O_4$ and C.I. 60645. This organic dye is also referred to as "Filester yellow 2648A" or "Filester yellow RN", chemical formula 1,1'-[(6-phenyl-1,3,5-triazine-2,4diyl)diimino]bis-.

In an alternative embodiment, the light-absorbing medium has a red-colored transmission and comprises, by way of example, "CHROMOPHTAL red A2B" with C.I. 65300. Said organic dye is alternatively referred to as "pigment red 177", dianthraquinonyl red or as [1,1'-Bianthracene]-9,9',10,10'-tetrone, 4,4'-diamino-(TSCA, DSL).

An embodiment of the electric lamp in accordance with the invention is characterized in that the interference film comprises layers of, alternately, a first layer of a material having a comparatively high refractive index and a second layer of a material having a comparatively low refractive index. The use of two materials simplifies the provision of the interference film. In an alternative embodiment, at least a third layer material is applied having a refractive index between that of the first layer and the second layer.

A preferred embodiment of the electric lamp in accordance with the invention is characterized in that the second layer of the interference film comprises predominantly silicon oxide, and the first layer of the interference film comprises predominantly a material having a refractive index which is high as compared to a refractive index of silicon oxide. Layers of silicon oxide can be provided comparatively readily using various deposition techniques.

Preferably, the first layer of the interference film comprises a material chosen from the group formed by titanium oxide, tantalum oxide, zirconium oxide, niobium oxide, hafnium oxide, silicon nitride and combinations of said materials. Preferably, the material of the first layer of the interference film predominantly comprises niobium oxide or silicon nitride.

Preferably, the interference films are $Nd_2O_5/SiO_2$ type films, $Ta_2O_5/SiO_2$ type films or mixtures thereof and comprise, preferably, at least 5 and at most approximately 17 layers. As a result of the comparatively small number of layers, the manufacturing costs of such an interference film are comparatively low.

The light source of the lamp may be an incandescent body, for example in a halogen-containing gas, or it may be an electrode pair in an ionizable gas, for example an inert gas with metal halides, possibly with, for example, mercury as a buffer gas. The light source may be surrounded by an innermost gastight envelope. It is alternatively possible, that the outermost envelope surrounds the lamp vessel.

The interference film and the light-absorbing layer may be provided in a customary manner by, for example, vapor deposition (PVD: physical vapor deposition) or by (dc) (reactive) sputtering or by a dip-coating or spraying process or by LP-CVD (low-pressure chemical vapor deposition), PE-CVD (plasma-enhanced CVD) or PI-CVD (plasma impulse chemical vapor deposition). The light-absorbing layer on the outer wall of the lamp vessel is preferably applied by spraying. If the light-absorbing medium forms part of the wall of the lamp vessel, then this medium is generally provided in the wall in the course of the manufacture of the lamp vessel.

It has been found that the combination of absorbing medium and interference film of the electric lamp in accordance with the invention substantially preserves its initial properties throughout the service life of the electric lamp.

BRIEF DESCRIPTION OF THE DRAWINGS

These and other aspects of the invention will be apparent from and elucidated with reference to the embodiment(s) described hereinafter.

In the drawings.

DETAILED DESCRIPTION OF THE INVENTION

The Figs. are purely schematic and not drawn to scale. Particularly for clarity, some dimensions are exaggerated strongly. In the Figures, like reference numerals refer to like parts whenever possible.

Figure 1A:
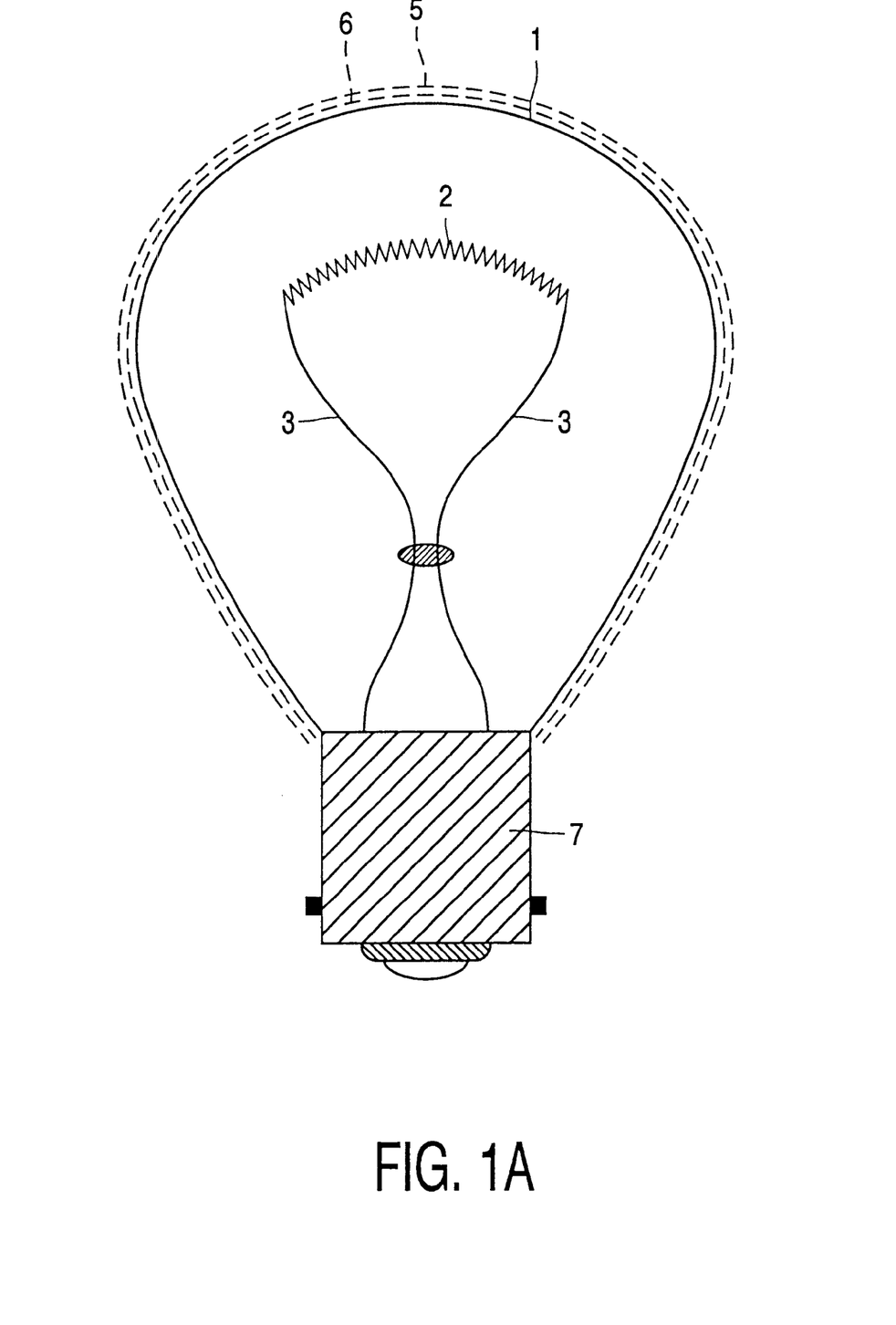
FIG. 1A is a cross-sectional view of an embodiment of the electric lamp in accordance with the invention.

FIG. 1A is a cross-sectional view of an embodiment of the electric lamp in accordance with the invention. Said electric lamp has a light-transmitting lamp vessel 1, for example of glass, which is sealed in a gastight manner and which accommodates an electric element 2, in the Figure a (spiral-shaped) tungsten incandescent body, which is connected to current conductors 3 which issue from the lamp vessel 1 to the exterior. The lamp shown, which is alternatively referred to as PY21W (12 volt, 21 watt) is filled with an inert gas, for example an $Ar/N_2$ mixture, having a filling pressure of approximately 1 bar.

Figure 1B:
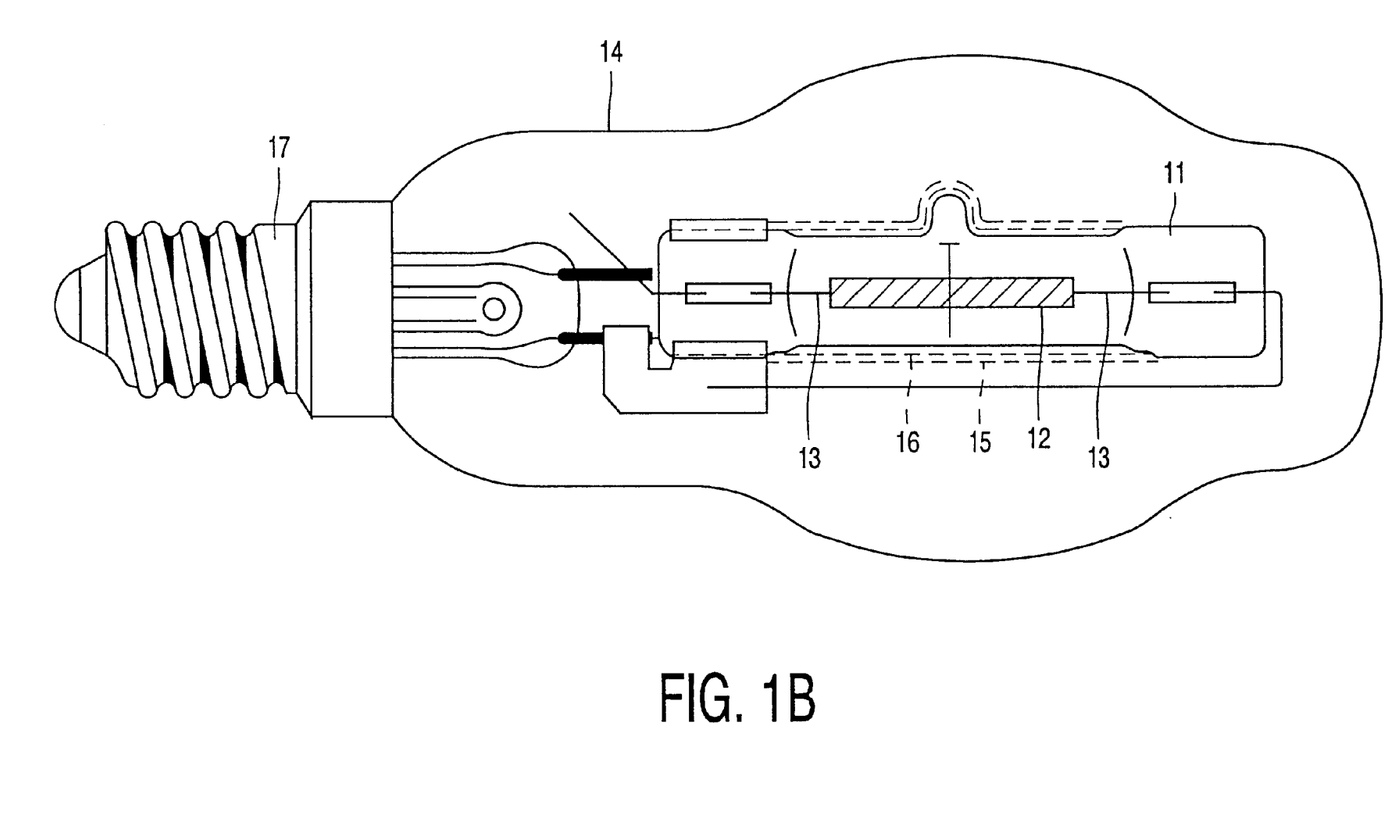
FIG. 1B is a side view of an alternative embodiment of the electric lamp in accordance with the invention.

In the embodiment of the electric lamp shown in FIG. 1A, the light-absorbing medium is provided, in the form of a light-absorbing coating 6, on an outside of the lamp vessel 1 (on a wall of the lamp vessel), and an interference film 5 is provided on said light-absorbing coating (also see FIG. 1B). The light-absorbing coating 6 comprises, in this case, for example a layer of the pigment (in the MTMS matrix) referred to as CHROMOPHTAL yellow in a layer thickness of, for example, 2 $\mu$m. An electric lamp provided with such a light-absorbing medium emits, in operation, amber-colored light, the spectral transmission in the visible region exhibiting a transition from $T \leq 0.1$ to $T \geq 0.9$ in a wavelength range from approximately $500 \leq \lambda \leq 560$ nm (the width of the wavelength range is approximately 60 nm). Such electric lamps are used as an indicator lamp, for example, in indicators of vehicles, and their service life is at least substantially 1200 hours. In an alternative embodiment of the coating, the light-absorbing coating 6 comprises a layer of CHROMOPHTAL red A2B having a layer thickness of for example 2 $\mu$m. An electric lamp provided with such a CHROMOPHTAL red A2B layer emits, in operation, red-colored light. Such electric lamps are used as brake lights in vehicles, and their service life is at least substantially 1200 hours.

In an alternative embodiment of the electric lamp shown in FIG. 1A, the wall of the lamp vessel comprises the light-absorbing medium.

In FIG. 1A, an interference film 5 is applied to the light-absorbing medium applied to the wall of the lamp vessel 1 (the "substrate"), which interference film comprises layers of alternately a first layer of a material having a comparatively high refractive index (also see FIG. 1C), for example titanium oxide (average refractive index of $TiO_2$ approximately 2.4–2.8), niobium oxide (average refractive index of $Nb_2O_5$ approximately 2.34), tantalum oxide (average refractive index of $Ta_2O_5$ approximately 2.18) or zirconium oxide (average refractive index of $ZrO_2$ approximately 2.16), and a second layer of, predominantly, silicon oxide (average refractive index approximately 1.46). The $TiO_2/SiO_2$, $Nb_2O_5/SiO_2$ or $Ta_2O_5/SiO_2$ interference films preferably comprise only a small number of layers. Experiments have shown that said interference films preferably comprise at least 5 and at most approximately 17 layers. For example, an interference film having a desired average reflection of approximately R=50% requires approximately 6 optical layers stacked in accordance with the notation $(HL)^3$ known to those skilled in the art, while, for example, a $Nb_2O_5/SiO_2$ interference film having a desired average reflection of approximately R=90% requires approximately 15 layers stacked in accordance with the notation $(HL)^7H$. As a result of the comparatively small number or layers, the manufacturing costs or such an interference film are comparatively low.

FIG. 1B is a side view of an alternative embodiment of the electric incandescent lamp in accordance with the invention. Said electric lamp comprises a quartz glass lamp vessel 11 accommodating an incandescent body as the light source 12. Current conductors 13 are connected to said light source and issue from the lamp vessel 11 to the exterior. The lamp vessel 11 is filled with a halogen-containing gas, for example hydrogen bromide. At least a part of the lamp vessel 11 is covered with a light-absorbing medium 16 in the form of a light-absorbing coating, which, in this example, is formed by (a MTMS matrix-containing) CHROMOPHTAL yellow or CHROMOPHTAL red A2B in a layer thickness of approximately 2 $\mu$m.

In the example shown in FIG. 1B, an interference film 15 is applied to the light-absorbing medium 16 and comprises layers of, alternately, a first layer of predominantly tantalum oxide and a second layer of a material comprising predominately tantalum oxide. The $Ta_2O_5/SiO_2$ interference film preferably comprises only a small number of layers. Experiments have shown that an interference film comprising fourteen layers of $Ta_2O_5/SiO_2$ is sufficient to obtain an average reflection of 80%.

The lamp vessel 11 in FIG. 1B is mounted in an outer bulb 14, which is supported by a lamp cap 17 to which the current conductors 13 are electrically connected. The lamp shown is a 60 W mains-voltage lamp having a service life of at least substantially 2500 hours.

Figure 1C:
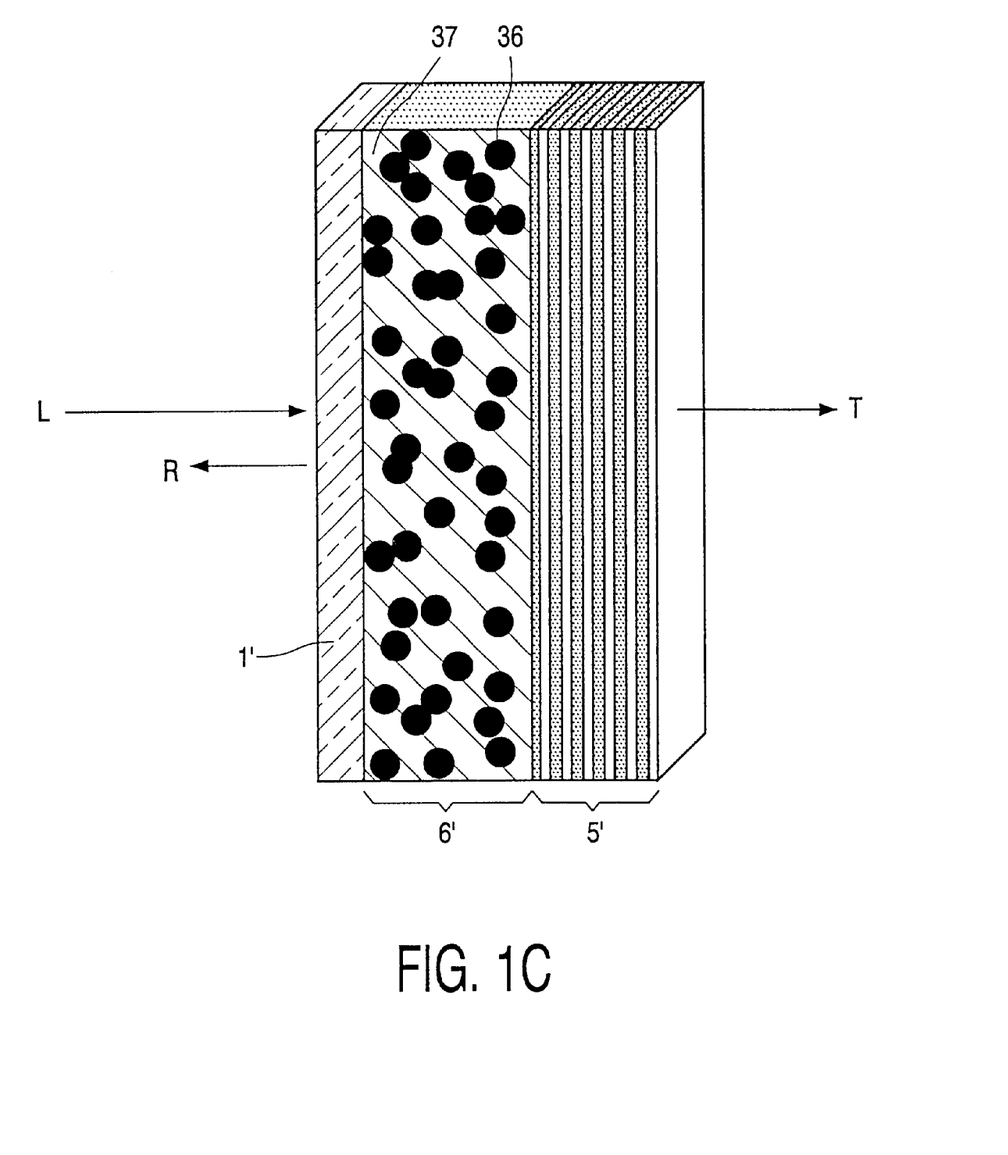
FIG. 1C is a diagrammatic, perspective view of a combination of a light-absorbing medium and an interference film in accordance with the invention.

FIG. 1C is a very diagrammatic, perspective view of a combination of a light-absorbing medium and an interference film in accordance with the invention. The light-absorbing medium 6' is provided on a substrate 1' (for example the glass wall of a lamp vessel) and comprises, in this example, a layer whose thickness is approximately 1–2 µm, which is composed of comparatively small light-absorbing particles 36 (average particle size below 100 nm) which are incorporated in an optically transparent sol-gel matrix 37. An interference film 5' is applied to this light-absorbing medium 6', which is built up of alternately a first layer of a material having a high refractive index and a second layer of a material having a comparatively low refractive index FIG. 1C diagrammatically shows the direction of the incident light, indicated by "L", the direction of the reflected light, indicated by "R", and the direction of the transmitted light, indicated by "T".

EXAMPLE

A coating comprising a light-absorbing medium in a network having an organically modified silane as the starting material is manufactured, for example, as follows:

A pigment (for example CHROMOPHTAL yellow) having an average particle size below 100 nm is dispersed in a water/ethanol mixture in the presence of "disperbyk 190" as the dispersing agent. An optically clear liquid is obtained by so-called "wet ball milling" using zirconium-oxide grains.

A hydrolysis mixture is prepared by mixing methyltrimethoxysilane (MTMS), tetraethylorthosilicate (TEOS), water, ethanol and glacial acetic acid.

A mixture of the pigment dispersion and the hydrolysis mixture are used to apply a light-absorbing layer (for example 1.5–2 µm) to the lamp vessel by spraying. The layer is subsequently cured at 250° C. for 5–10 minutes.

Table I and II show two embodiments of combinations of a light-absorbing medium in the form of a coating including an amber or red pigment and an eleven-layer $Nb_2O_5/SiO_2$ interference film having an average reflection of 80% or a twelve layer $Ta_2O_5/SiO_2$ interference film having an average reflection of 70%.

TABLE I

Embodiment of a first combination of a light-absorbing medium (pigment) and a $Nb_2O_5/SiO_2$ interference film having an average reflection R = 0.8.

| Layer | Material | Thickness (nm) |
|---|---|---|
|  | substrate (glass) | — |
| 1 | pigment | ≈1800 |
| 2 | $Nb_2O_5$ | 84 |
| 3 | $SiO_2$ | 116 |
| 4 | $Nb_2O_5$ | 69 |
| 5 | $SiO_2$ | 109 |
| 6 | $Nb_2O_5$ | 65 |
| 7 | $SiO_2$ | 94 |
| 8 | $Nb_2O_5$ | 49 |
| 9 | $SiO_2$ | 86 |
| 10 | $Nb_2O_5$ | 41 |
| 11 | $SiO_2$ | 84 |
| 12 | $Nb_2O_5$ | 22 |
|  | air | — |

TABLE II

Embodiment of a second combination of a light-absorbing medium (pigment) and a $Ta_2O_5/SiO_2$ interference film having an average reflection R = 0.7.

| Layer | Material | Thickness (nm) |
|---|---|---|
|  | substrate (glass) | — |
| 1 | pigment | ≈1800 |
| 2 | $Ta_2O_5$ | 89 |
| 3 | $SiO_2$ | 114 |
| 4 | $Ta_2O_5$ | 71 |
| 5 | $SiO_2$ | 106 |
| 6 | $Ta_2O_5$ | 71 |
| 7 | $SiO_2$ | 100 |
| 8 | $Ta_2O_5$ | 61 |
| 9 | $SiO_2$ | 73 |
| 10 | $Ta_2O_5$ | 33 |
| 11 | $SiO_2$ | 81 |
| 12 | $Ta_2O_5$ | 62 |
| 13 | $SiO_2$ | 128 |
|  | air | — |

Figure 2A:
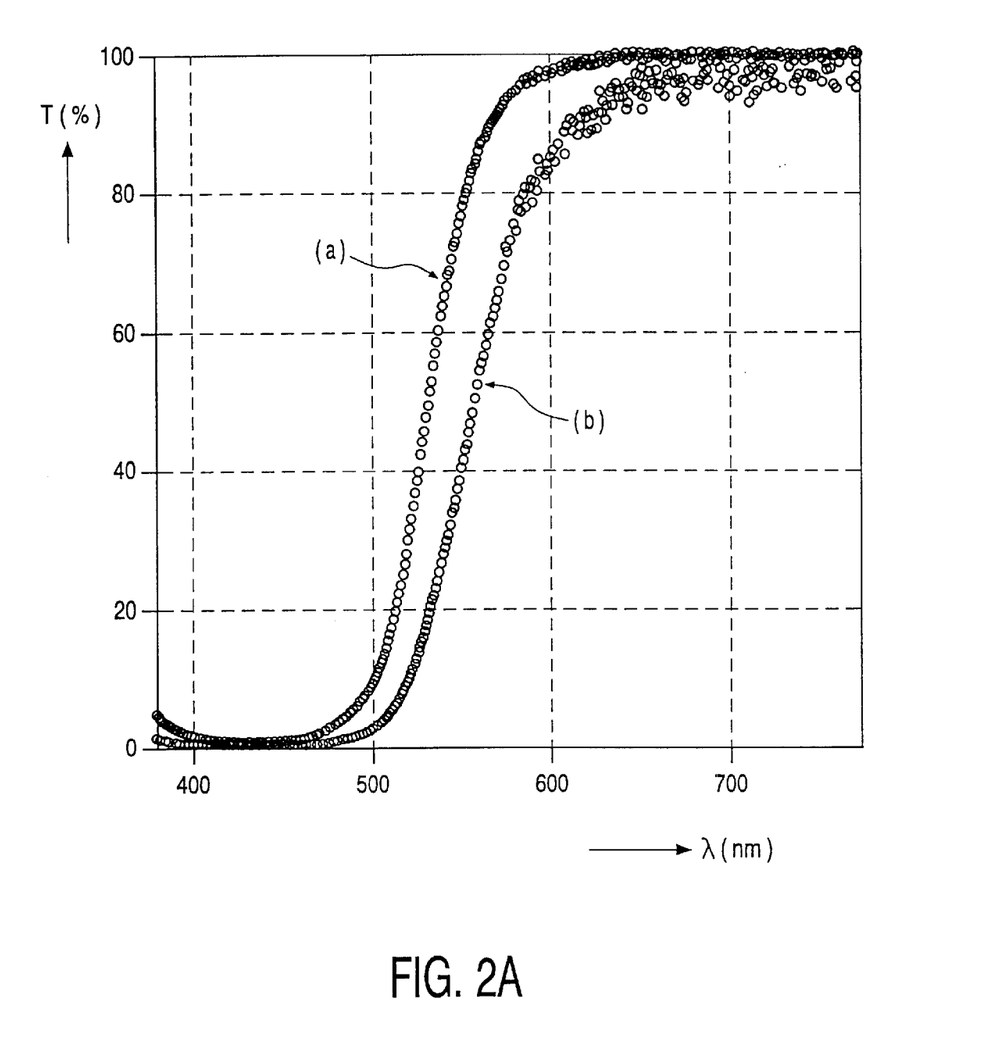
FIG. 2A shows the transmission spectrum as a function of the wavelength of a light-absorbing medium in accordance with the invention, and of a combination of the light-absorbing medium and a $Ta_2O_5/SiO_2$ interference film in accordance with the invention.

FIG. 2A shows the transmission spectrum as a function of the wavelength λ (in nm) of a light-absorbing medium in accordance with the invention and of a combination of a coating containing a light-absorbing medium comprising CHROMOPHTAL yellow in a network containing an organically modified silane as the starting material and a $Ta_2O_5/SiO_2$ interference film having an average reflection of 70% (in order to obtain such a reflection with an interference film based on $Ta_2O_5/SiO_2$, the interference film comprises approximately twelve layers). Curve (a) in FIG. 2A shows the transmission spectrum of the light-absorbing medium. This spectrum is obtained by a light measurement in a so-called integrating sphere. Curve (a) exhibits a transition from T≦0.1 to T≧0.9 around a wavelength $λ_{50\%}$≈530 nm in the visible region. Curve (b) in FIG. 2A shows the transmission spectrum of the combination of the light absorbing medium and the interference film. Said Figure clearly shows that curve (b) is slightly less steep than curve (a). A shift of the absorption curve to higher wavelength is brought about by covering the light-absorbing medium with a so-called "flat" interference film (having an average reflection in the visible region of approximately 75%). This is caused by an increase in absorption by multiple reflections. In order to attain a color point of the lamp that is situated within the statutory color gamuts, use is made of pigments having comparatively steep absorption curves.

By using the interference film in accordance with the invention, in FIG. 2A, the so-called cut-off wavelength $λ_{50\%}$ of the light-absorbing medium shifts from $λ_{50\%}$≈530 nm to $λ_{50\%}$≈550 nm for the combination of light-absorbing medium and interference film, and thus complies with the statutory regulations to be met by the color point of the light emitted by the electric lamp in operation. The transmission T of the combination of light-absorbing medium and interference film meets the following relation (based on a (punctiform) light source situated in the center of a sphere):

$$T = (1-R)\frac{e^{-\gamma l}}{1 - Re^{-2\gamma l}}$$

wherein
R is the reflection of the interference film;
γ is the absorption coefficient of the light-absorbing medium (in $cm^{-1}$); and
l is the thickness of the coating comprising the light-absorbing medium (in cm).

Figure 2B:
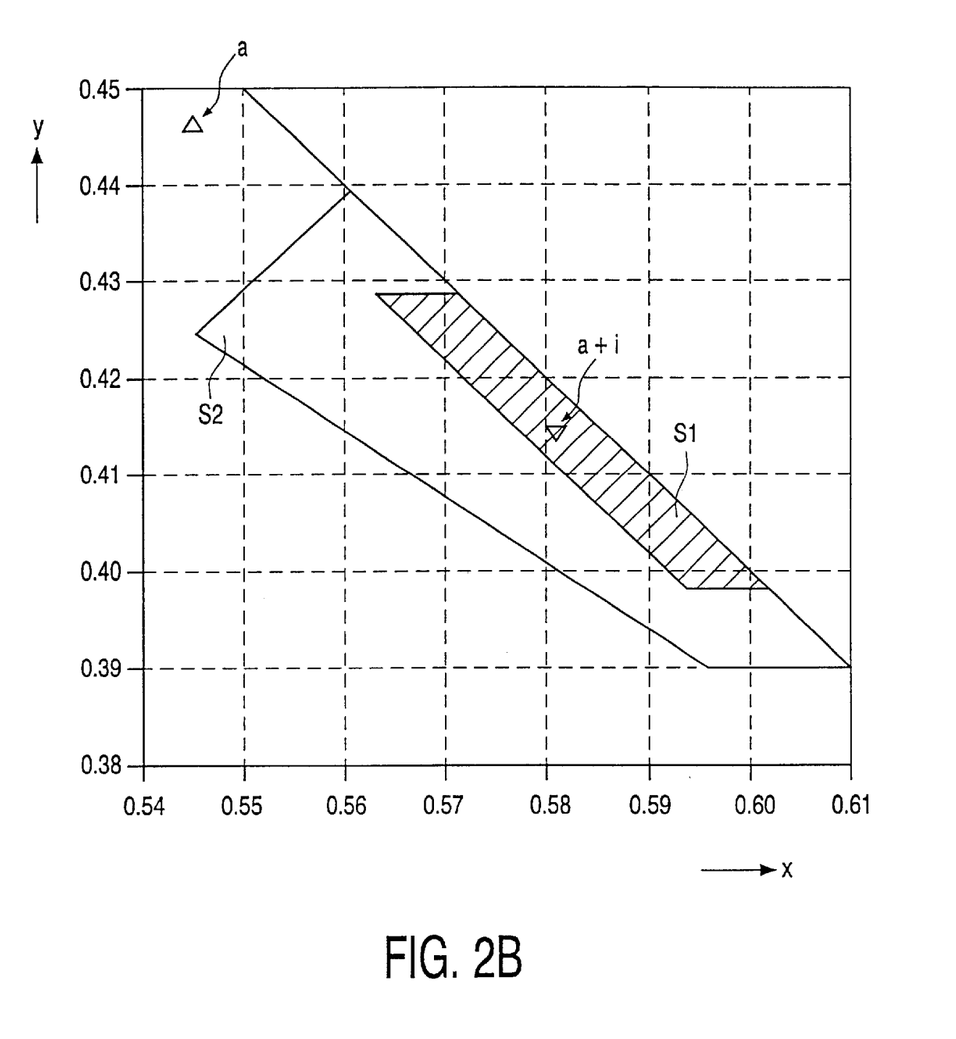
FIG. 2B shows, in a part of a C.I.E. 1931 color triangle diagram, the color co-ordinates of an electric lamp comprising the light-absorbing medium of FIG. 2A, and of the combination of the light-absorbing medium and the $Ta_2O_5/SiO_2$ interference film of FIG. 2A.

FIG. 2B shows, in a part of a C.I.E. 1931 color triangle diagram, the color co-ordinates of an electric lamp with the light-absorbing medium of FIG. 2A and of the combination of the light-absorbing medium and the $Ta_2O_5/SiO_2$ interference film of FIG. 2A. The point referenced (a) in FIG. 2B corresponds to the color co-ordinates of an electric lamp comprising only the light-absorbing medium, while the point referenced (a+i) corresponds to the color co-ordinates of an electric lamp provided with the combination of the light-absorbing medium and the interference film.

FIG. 2B also shows two specified areas in the color triangle, wherein the color point of an electric lamp, which is used as an amber-colored indicator for an automobile, should be situated. The hatched area referenced S1 corresponds to the European ECE standard for an amber-colored indicator, which standard is known to those skilled in the art. The amber ECE range is determined by the color co-ordinates (0.571, 0.429), (0.564, 0.429), (0.595, 0.398) and (0.602, 0.398). The area referenced S2 corresponds to the American SAE standard for an amber-colored indicator, which standard is known to those skilled in the art. The amber SAE range is determined by the color co-ordinates (0.560, 0.440), (0.545, 0.425), (0.597, 0.390) and (0.610, 0.390). The combination of the light-absorbing medium and the interference film applied to an electric lamp can suitably be used as an amber-colored indicator and passes the Fakra test known to those skilled in the art.

A further specification for an indicator lamp (direction indicator) in a vehicle relates to the lumen output of the lamp which, in operation, should be 280 lm with a maximum spread of 20%. The point referenced (a) in FIG. 2B has a lumen output of 395 lm, while the lumen output of the point referenced (a+i) is 289 lm.

Figure 3:
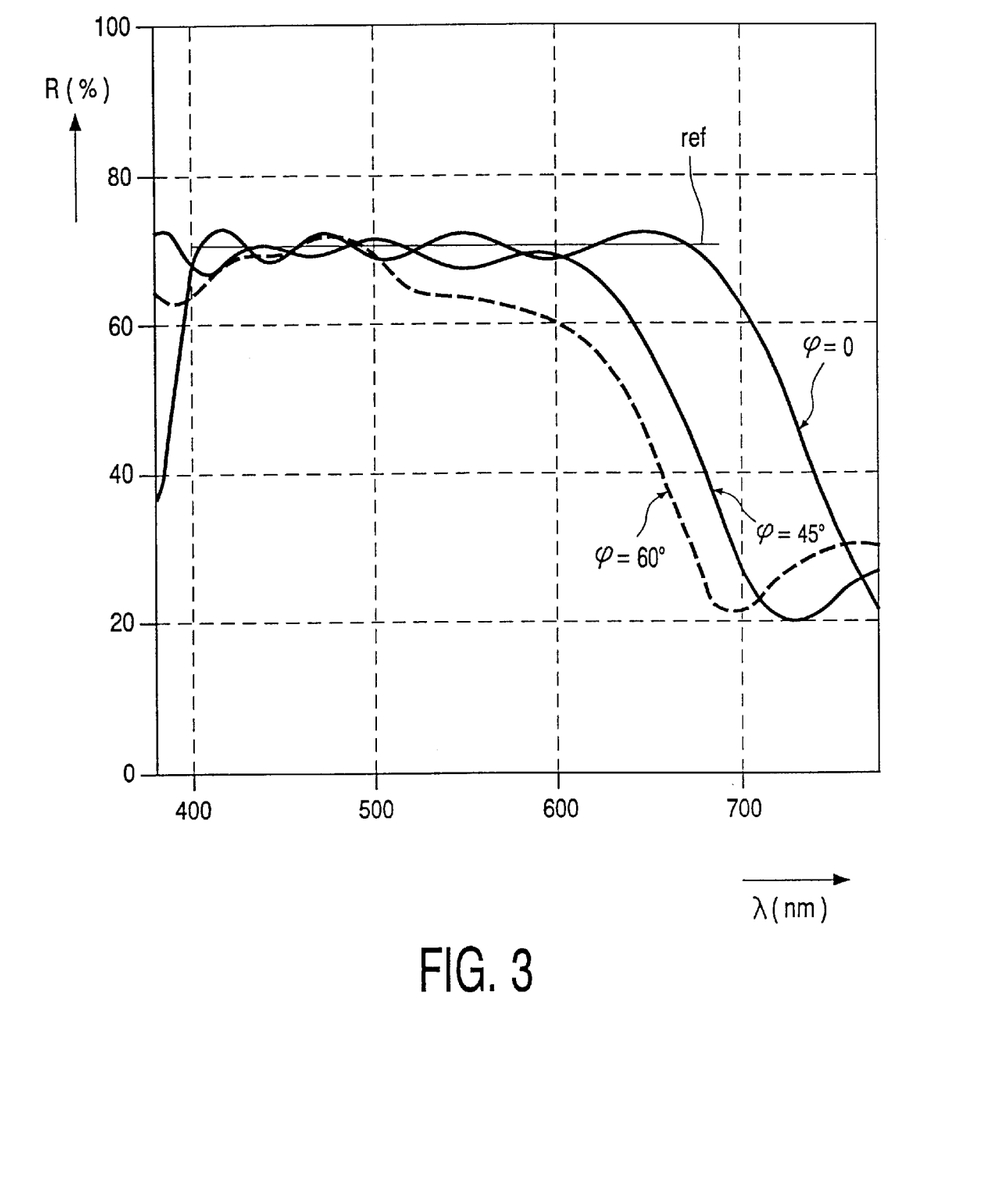
FIG. 3 shows the calculated reflection spectrum as a function of the wavelength of a $Ta_2O_5/SiO_2$ interference film in accordance with the invention at different angles of incidence of the light.

FIG. 3 shows the calculated reflection spectrum as a function of the wavelength $\lambda$ (in nm) of an eleven-layer $Ta_2O_5/SiO_5$ interference film in accordance with the design:

$$glass|(HL)^5H|\ air$$

at different angles of incidence of the light ($\phi=0°$, $\phi=45°$ and $\phi=60°$). The horizontal line indicated by "ref" shows the desired average reflection value (R≈70%) in the wavelength range from $400 \leq \lambda \leq 690$ nm. For angles of incidence of light up to at least 30°, the reflection R of the interference film in the wavelength range from $400 \leq \lambda \leq 690$ nm meets the relation $\Delta R \leq 10\%$.

Figure 4:
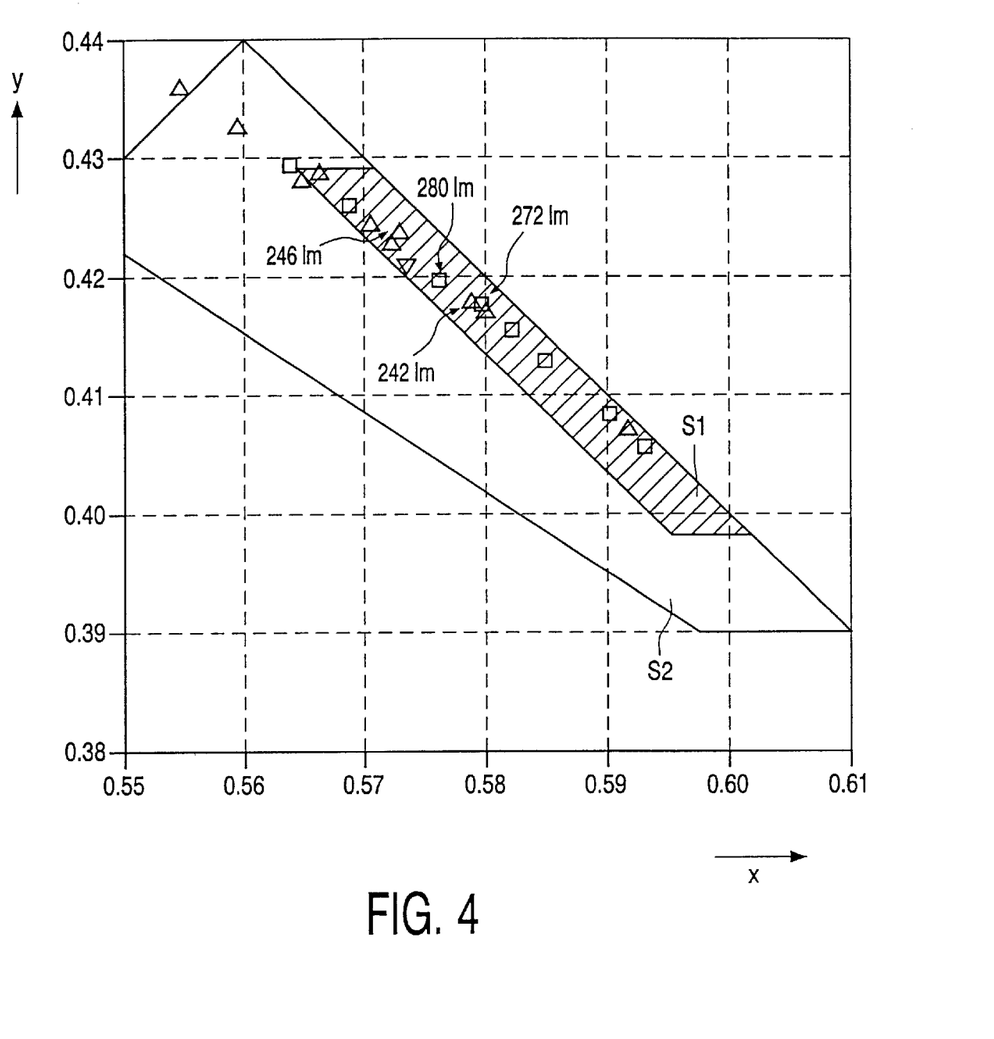
FIG. 4 shows, in a part of a C.I.E. 1931 color triangle diagram, the color co-ordinates of electric lamps provided with a combination of the light-absorbing medium and various $Ta_2O_5/SiO_2$ interference films.

FIG. 4 shows, in a part of a C.I.E. 1931 color triangle diagram, the color co-ordinates of electric lamps provided with a combination of the light-absorbing medium and the various $Ta_2O_5/SiO_2$ interference films at different average reflection values (in a range from $60 \leq R \leq 80\%$). To obtain an interference film on the basis of $Ta_2O_5/SiO_2$ having an average reflection of approximately 60%, a stack of approximately nine layers is sufficient, to obtain an interference film having an average reflection of approximately 70%, a stack of approximately twelve layers is sufficient, and to obtain an interference film having an average reflection of approximately 80%, a stack of approximately 14 layers is desirable. The lumen output of the various combinations of light-absorbing medium and interference films are indicated at four color points.

In FIG. 4, the lumen output of four points is indicated. These four points correspond to an interference film having an average reflection R≈0.7. These four points meet the specification for an indicator lamp (direction indicator) in a vehicle, the lumen output of the lamp, in operation, being 280 lm with a maximum spread of 20%. In FIG. 4, the point indicated by a triangle pointing downwards corresponds to an interference film having an average reflection R=0.8. All other points in FIG. 4 correspond to an interference film having an average reflection R=0.6.

FIG. 4 also shows two specified areas in the color triangle, wherein the color point of an electric lamp used as an amber-colored indicator for an automobile should be situated. In FIG. 4, the hatched area referenced S1 corresponds to the European ECE standard for an amber-colored indicator, and the area referenced S2 corresponds to the American SAE standard for an amber-colored indicator, both standards being known to those skilled in the art.

Figure 5:
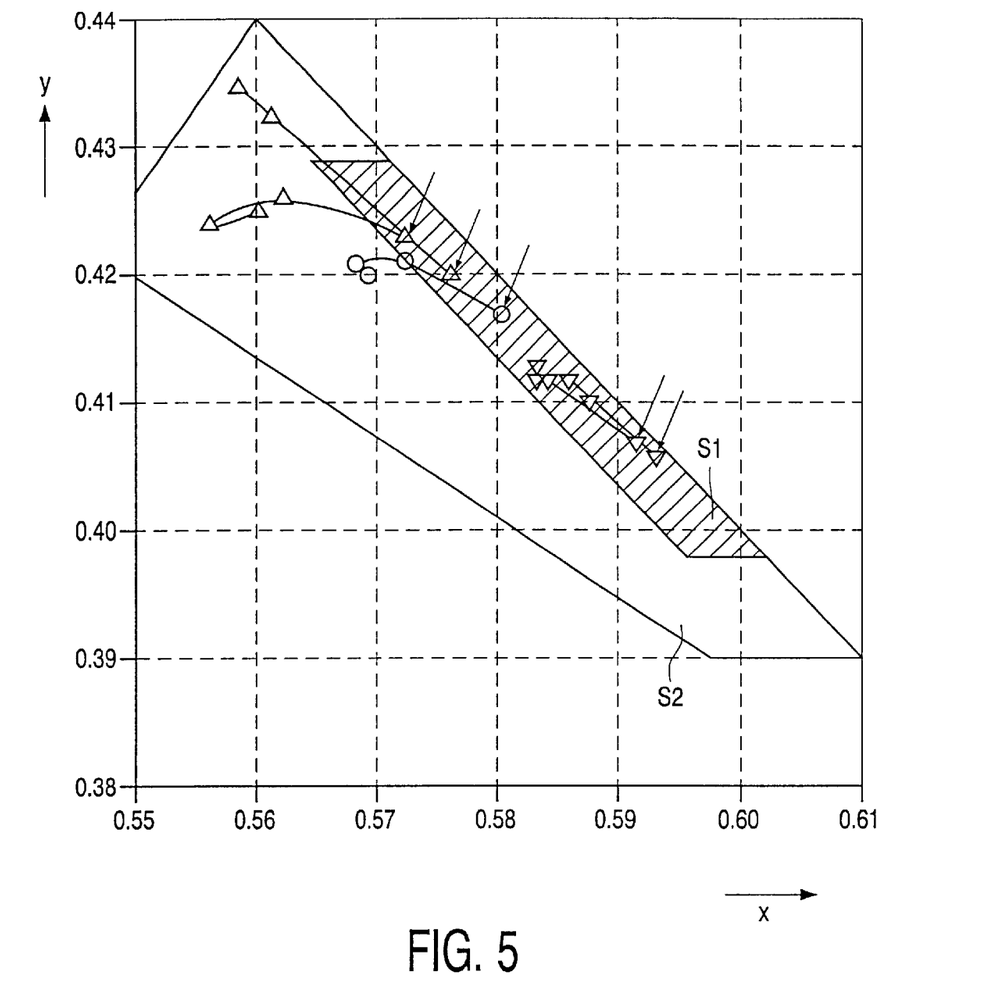
FIG. 5 shows, in a part of a C.I.E. 1931 color triangle diagram, the time-dependence of the color co-ordinates of electric lamps provided with a combination of the light-absorbing medium and a $Ta_2O_5/SiO_2$ interference film.

FIG. 5 shows, in a part of a C.I.E. 1931 color triangle diagram, the time-dependence of the color co-ordinates of electric lamps provided with a combination of the light-absorbing medium and a $Ta_2O_5/SiO_2$ interference film having an average reflection of 60% (in this example, the interference film comprises a stack of 9 layers). The starting point of a color point at 0 hours is indicated by an arrow, after which the connecting lines between the points show the dependence of the color point as a function of time. In this connection, the following sequence is applied: the lamps flash for 8 hours at a frequency of 1.5 Hz and subsequently there is a period of rest which lasts 4 hours. During the measurements, the electric lamps are exposed to extreme conditions, i.e., an atmosphere of saturated water vapor. The range of the measurements comprises a service life of 600 hours. The hatched area in FIG. 4, referenced S1, corresponds to the European ECE standard for an amber-colored indicator, and the area referenced S2 corresponds to the American SAE standard for an amber-colored indicator, both standards being known to those skilled in the art.

It will be clear that, within the scope of the invention, many variations are possible to those skilled in the art.

The scope of protection of the invention is not limited to the examples given herein. The invention is embodied in each novel characteristic and each combination of characteristics. Reference numerals in the claims do not limit the scope of protection thereof. The use of the verb "to comprise" and its conjugations does not exclude the presence of elements other than those mentioned in the claims. The use of the article "a" or "an" in front of an element does not exclude the presence of a plurality of such elements.

What is claimed is:

1. An electric lamp, comprising:

a light source (2; 12); and a light-transmitting lamp vessel (1; 11) provided with a light-absorbing medium (6; 16) and an interference film (5, 15), said light source (2; 12) arranged in said light-transmitting vessel (1; 11) said light-absorbing medium (6; 16) exhibiting a spectral transition in the visible range, wherein said light absorbing medium (6; 16) and said interference film (5; 15) includes means for changing a spectral transmission T of light transmitted by said light-absorbing medium (6; 16) from $T \leq 0.15$ to $T \geq 0.75$ in a first wavelength range having a width $\lambda \leq 75$ nm.

2. The electric lamp of claim 1, wherein said interference film (5; 15) further includes means for establishing a variation in a reflection R of said interference film (5; 15) in a second wavelength range from $400 \leq \lambda \leq 690$ nm is less than 10%.

3. The electric lamp of claim 1, wherein a wall of said light-transmitting lamp vessel (1) includes said light-absorbing medium (6; 16).

4. The electric lamp of claim 1, wherein said light-absorbing medium (6; 16) includes a light-absorbing coating situated between said light-transmitting lamp vessel (11) and said interference film (15).

* * * * *